US012783275B2

(12) United States Patent
Li et al.

(10) Patent No.: US 12,783,275 B2
(45) Date of Patent: Nov. 3, 2026

(54) CONTAINER SCHEDULING AND DEPLOYMENT METHOD AND APPARATUS, AND DOMAIN CONTROLLER SYSTEM

(71) Applicant: Black Sesame Technologies (Chongqing) Co., Ltd., Chongqing (CN)

(72) Inventors: Lin Li, Chengdu (CN); Biao Sun, Chengdu (CN)

(73) Assignee: Black Sesame Technologies (Chongqing) Co., Ltd., Chongqing (CN)

( * ) Notice: Subject to any disclaimer, the term of this patent is extended or adjusted under 35 U.S.C. 154(b) by 438 days.

(21) Appl. No.: 18/233,117

(22) Filed: Aug. 11, 2023

(65) Prior Publication Data

US 2024/0054000 A1 Feb. 15, 2024

(30) Foreign Application Priority Data

Aug. 11, 2022 (CN) ......................... 202210963186.5

(51) Int. Cl.
*G06F 9/455* (2018.01)

(52) U.S. Cl.
CPC .................... *G06F 9/45558* (2013.01); *G06F 2009/45562* (2013.01)

(58) Field of Classification Search
None
See application file for complete search history.

(56) References Cited

U.S. PATENT DOCUMENTS

2021/0034423 A1* 2/2021 Hallur ................. G06F 9/45558
2021/0185095 A1 6/2021 Harel et al.
2022/0171648 A1* 6/2022 Rodriguez .......... G06F 9/45533
2023/0334541 A1* 10/2023 Panikkar ................. G06F 11/34

FOREIGN PATENT DOCUMENTS

CN 112532711 3/2021
CN 112596741 4/2021
CN 113448837 A 9/2021
WO WO-2020047016 A1 * 3/2020 ............. H04L 63/20

* cited by examiner

*Primary Examiner* — Bradley A Teets
*Assistant Examiner* — Melissa A Headly
(74) *Attorney, Agent, or Firm* — Fish & Richardson P.C.

(57) ABSTRACT

A container scheduling and deployment method and apparatus, and a domain controller system. The method includes: scheduling and deploying, based on a domain controller node of the domain controller system, a container corresponding to the domain controller node when a current application environment of the domain controller system is a formal environment; and scheduling and deploying, based on a remote server of the domain controller system, the container when the current application environment of the domain controller system is a development test environment. According to one aspect, a flexible selection of subject used to perform scheduling and deploying on the container of the domain controller node for different application environments may be realized. Therefore, a dynamic management of the domain controller system may be completed, and a high expansibility and high availability of performance of the domain controller system may be ensured.

18 Claims, 3 Drawing Sheets

CONTAINER SCHEDULING AND DEPLOYMENT METHOD AND APPARATUS, AND DOMAIN CONTROLLER SYSTEM

CROSS-REFERENCE TO RELATED APPLICATION

This application claims the benefit under 35 U.S.C. § 119(a) of the filing date of Chinese Patent Application No. 202210963186.5, filed in the Chinese Patent Office on Aug. 11, 2022. The disclosure of the foregoing application is herein incorporated by reference in its entirety.

TECHNICAL FIELD

The present application relates to the field of communication technologies, and in particular, to a container scheduling and deployment method and apparatus, and a domain controller system.

BACKGROUND

Container technology is a kernel-lightweight virtualization technology in an operating system layer, and is capable of isolating processes and resources. Compared with a conventional virtualization technology, of which environment creation, application deployment, and portability of applications are very complex, the container technology may easily realize a flexible migration and deployment in various environments.

However, a current container scheduling and deployment method in a domain controller system may not realize load balance for containers in the domain controller, and may fail to dynamically adjust allocation and deployment of the containers in the domain controller. Thus, when a node in the domain controller is in a high-load state, user experience may decrease and performance of the whole domain controller system may be affected.

SUMMARY

In order to solve a technical problem described above, the present application is provided. An embodiment of the present application provides a container scheduling and deployment method and apparatus, and a domain controller system.

In a first aspect, an embodiment of the present application provides a container scheduling and deployment method, applied to a domain controller system of a vehicle. The method includes: scheduling and deploying, based on a domain controller node of the domain controller system, a container corresponding to the domain controller node when a current application environment of the domain controller system is a formal environment; and scheduling and deploying, based on a remote server of the domain controller system, the container corresponding to the domain controller node when the current application environment of the domain controller system is a development test environment.

According to the first aspect, in some implementations of the first aspect, the scheduling and deploying, based on a domain controller node of the domain controller system, a container corresponding to the domain controller node includes: performing, based on a current operation status of the domain controller system, capacity expansion or capacity reduction on the container corresponding to the domain controller node by utilizing the domain controller node.

According to the first aspect, in some implementations of the first aspect, the scheduling and deploying, based on a domain controller node of the domain controller system, a container corresponding to the domain controller node includes: when the container corresponding to the domain controller node is a failed container, deleting the failed container and creating a new container corresponding to the failed container by utilizing the domain controller node.

According to the first aspect, in some implementations of the first aspect, the scheduling and deploying, based on a remote server of the domain controller system, the container corresponding to the domain controller node includes: distributing, based on a usage scenario of the domain controller system, a container application corresponding to the usage scenario to the domain controller node of the domain controller system by utilizing the remote server, so that the domain controller node completes an application deployment.

According to the first aspect, in some implementations of the first aspect, a containerd container is adopted as the container, and the containerd container is used for decoupling functional modules in the domain controller node.

According to the first aspect, in some implementations of the first aspect, a K3s deployment mode is applied to the container.

In a second aspect, an embodiment of the present application provides a container scheduling and deployment apparatus, applied to a domain controller system of a vehicle. The apparatus includes: a first scheduling and deployment module, configured to schedule and deploy, based on a domain controller node of the domain controller system, a container corresponding to the domain controller node when a current application environment of the domain controller system is a formal environment; and a second scheduling and deployment module, configured to schedule and deploy, based on a remote server of the domain controller system, the container corresponding to the domain controller node when the current application environment of the domain controller system is a development test environment.

In a third aspect, an embodiment of the present application provides a domain controller system. The domain controller system includes: a domain controller node, configured to schedule and deploy a container corresponding to the domain controller node when a current application environment of the domain controller system is a formal environment; and a remote server, configured to schedule and deploy the container corresponding to the domain controller node when the current application environment of the domain controller system is a development test environment.

According to the third aspect, in some implementations of the third aspect, the domain controller system further includes: a storage server, configured to store the container.

In a fourth aspect, an embodiment of the present application provides a computer-readable storage medium, where the storage medium stores a computer program, and the computer program is configured to execute the container scheduling and deployment method according to the first aspect.

In a fifth aspect, an embodiment of the present application provides an electronic device, where the electronic device includes: a processor; a memory for storing an instruction executable by the processor; and the processor is configured to execute the container scheduling and deployment method according to the first aspect.

The container scheduling and deployment method provided by the embodiments of the present application, includes: scheduling and deploying, based on a domain controller node of the domain controller system, a container corresponding to the domain controller node when a current application environment of the domain controller system is a formal environment; and scheduling and deploying, based on a remote server of the domain controller system, the container corresponding to the domain controller node when the current application environment of the domain controller system is a development test environment. According to technical solutions in the embodiments of the present application, scheduling and deployment for a container on a domain controller node in different application stages may be realized. Therefore, a dynamic management of the domain controller system may be completed, and a high expansibility and high availability of performance of the domain controller system may be ensured.

BRIEF DESCRIPTION OF THE DRAWINGS

Through a more detailed description of embodiments of the present application with reference to accompanying drawings, objects, features and advantages of the present application described above and the others may become more apparent. The accompanying drawings are used to provide a further understanding of the embodiments of the present application, and constitute a part of the specification. The accompanying drawings are used to explain the present application together with the embodiments of the present application, and do not constitute a limitation on the present application. In the accompanying drawings, the same reference numeral generally represents the same component or step.

DETAILED DESCRIPTION OF THE EMBODIMENTS

Figure 1:
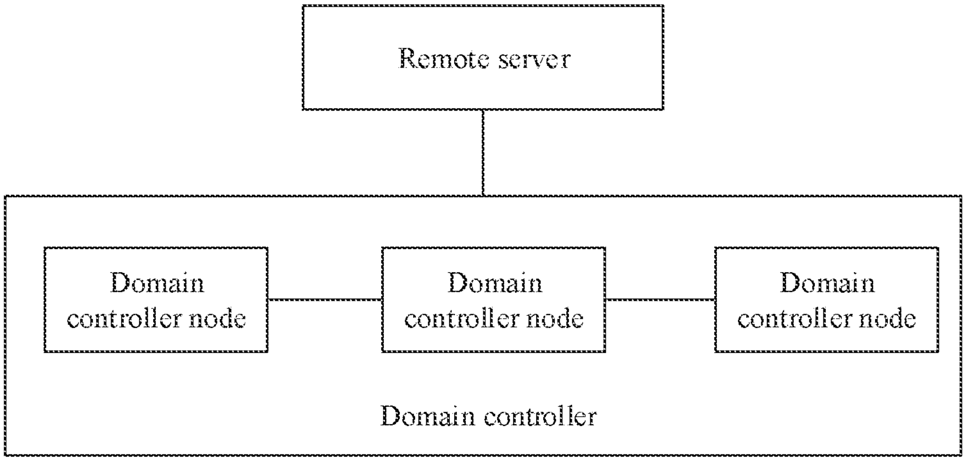
FIG. 1 is a schematic diagram of a scenario applicable to an embodiment of the present application.

Technical solutions in embodiments of the present disclosure will be clearly and completely described below with reference to accompanying drawings in the embodiments of the present application. Obviously, the described embodiments are only a part of the embodiments of the present application, but not all of the embodiments. Based on the embodiments in the present application, all other embodiments obtained by those skilled in the art without creative efforts shall fall within a protection scope of the present application.

Overview

A cluster, is a group of mutually independent computers, and each cluster node is an independent server used for running a service respectively.

Orchestration, is a process of specifying, based on a coupling relationship between deployed objects and dependence of a deployed object environment, an execution sequence of each operation in a deployment procedure, a storage position and an acquisition mode of a dependency file required in the deployment process, and how to verify whether a deployment is successful.

The deployment includes: based on content and procedure specified in the orchestration, performing environment initialization specified in the orchestration on a target machine, storing dependency and files which are specified, running a specified deployment action, and finally confirming whether a deployment is successful according to a rule in the orchestration.

A scheduling and deployment mode of a container is of great importance to a domain controller system. In a related art, generally, a command related to a Docker is installed on a storage server where a cluster is stored to divided the storage server into different levels. And then, based on a result of level division, a Docker mirror image is pushed to each level of the storage server respectively, and a creation and start request for a Docker container is sent to each level of the storage server, so that the storage server may start the Docker container based on the Docker mirror image. However, this solution only provides a Docker container deployed based on the levels and sequence of the storage server, but not provides a dynamic management of a storage cluster, so that the whole cluster lacks a high availability and expansion capability.

In addition, a related container scheduling and deployment method further includes: acquiring a feature identifier of a computing node; binding the feature identifier to a computing node to be bound based on the obtained feature identifier; acquiring, based on a feature of a usage scenario, a scenario application to be deployed; and transmitting a feature of the scenario application to the computing node for the computing node to complete an application deployment. However, this solution likewise may not complete a dynamic adjustment and insensible updating of a functional module.

In view of this, embodiments of the present application provide a container scheduling and deployment method, including: scheduling and deploying, based on a domain controller node of the domain controller system, a container corresponding to the domain controller node when a current application environment of the domain controller system is a formal environment; and scheduling and deploying, based on a remote server of the domain controller system, the container corresponding to the domain controller node when the current application environment of the domain controller system is a development test environment. The present application may realize a flexible selection between the domain controller node and the remote server to perform scheduling and deploying for different application environments, so that a cluster management in different application stages is realized.

Exemplary Application Scenario

FIG. 1 is a schematic diagram of a scenario applicable to an embodiment of the present application. The schematic diagram of the scenario includes a domain controller and a remote server, and the domain controller includes a plurality of domain controller nodes. Specifically, if a current application environment of a domain controller system is a formal environment, a container of the domain controller node is scheduled and deployed by the domain controller node, where the domain controller node includes, but is not limited to, an Electronic Control Unit (ECU). In addition, if a current application environment of the domain controller system is a development test environment, the container of the domain controller node is scheduled and deployed by a remote server, so as to adapt to management requirements of different application stages of the domain controller system.

Exemplary Method

Figure 2:
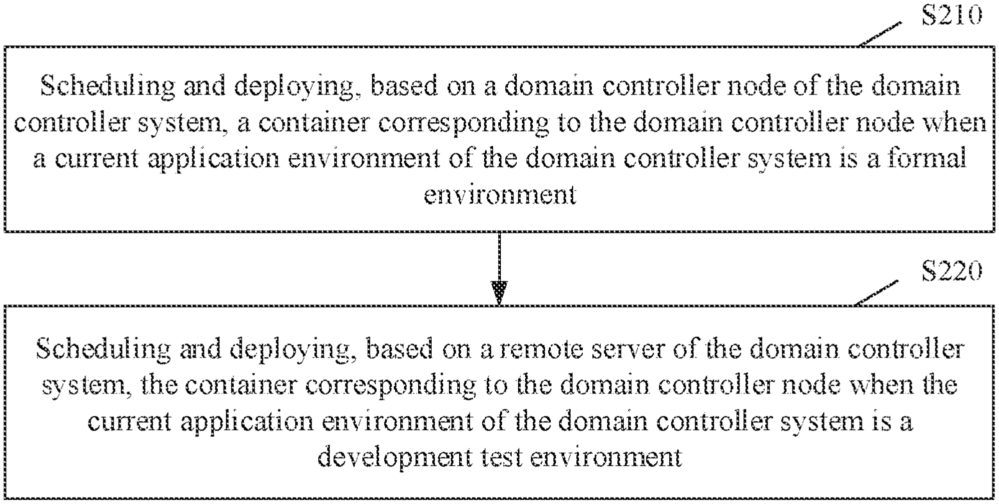
FIG. 2 is a flowchart of a container scheduling and deployment method provided by an exemplary embodiment of the present application.

FIG. 2 is a flowchart of a container scheduling and deployment method provided by an exemplary embodiment of the present application. Exemplarily, the container scheduling and deployment method is applied to a domain controller system of a vehicle. As shown in FIG. 2, the container scheduling and deployment method provided by the embodiment of the present application includes the following steps.

Step S210: scheduling and deploying, based on a domain controller node of the domain controller system, a container corresponding to the domain controller node when a current application environment of the domain controller system is a formal environment.

Specifically, the formal environment is a real application environment. When the current application environment of the domain controller system is the formal environment, the domain controller node is used to schedule and deploy the container of the domain controller node, to realize a self-healing of a cluster in the domain controller system.

The domain controller system includes, but is not limited to, a domain controller system of an Advanced Driver Assistance System (ADAS), and the domain controller node includes, but is not limited to, an Electronic Control Unit (ECU) node.

Step S220: scheduling and deploying, based on a remote server of the domain controller system, the container corresponding to the domain controller node when the current application environment of the domain controller system is a development test environment.

Specifically, the development test environment refers to a description of a software and a hardware environment where the software is run, as well as any other software interacting with a software under test.

First, the remote server acquires a feature identifier of a domain controller node to be bound. And the remote server is bound to the domain controller node based on the obtained feature identifier. Then, the remote server acquires a current usage scenario feature of the domain controller node, and distribute a container application corresponding to the current usage scenario to the domain controller node based on the usage scenario feature, to enable the domain controller node to complete an application deployment.

In addition, the usage scenario is an application situation of the domain controller node. For example, the usage scenario includes a vehicle-road cooperative usage scenario or an ADAS usage scenario.

According to the solution in the embodiment of the present application, different scheduling and deployment modes may be flexibly selected based on application environments at different stages of the domain controller system. Specifically, when a domain controller system is in a formal environment, a domain controller node is used to schedule and deploy a container of the domain controller node; and when the domain controller system is in a development test environment, a remote server is used to schedule and deploy the container of the domain controller node, thereby ensuring a dynamic adjustment of the domain controller system, and ensuring a high expansibility and high availability of performance of the domain controller system. In addition, compared with a common solution of a virtual machine, where the virtual machine is configured with a virtual layer, leading to a greater potential risk faced by the virtual machine, the container of the node is scheduled and deployed by the domain controller node or the remote server according to the embodiment of the present application, which may reduce a risk of a network attack.

Figure 3:
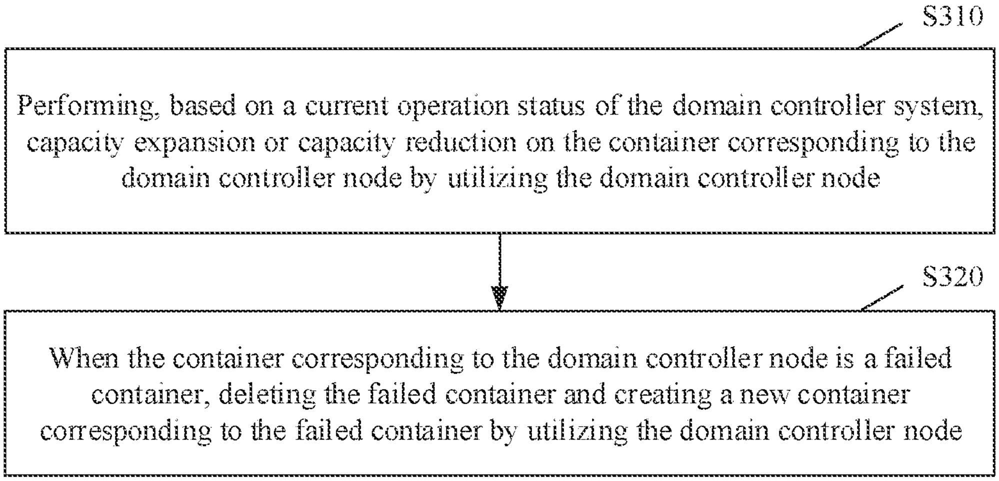
FIG. 3 is a flowchart for scheduling and deploying a container corresponding to a domain controller node provided by an exemplary embodiment of the present application.

FIG. 3 is a flowchart for scheduling and deploying a container corresponding to a domain controller node provided by an exemplary embodiment of the present application. The embodiment shown in FIG. 3 is extended based on the embodiment shown in FIG. 2, and a difference between the embodiment shown in FIG. 3 and the embodiment shown in FIG. 2 will be described below, and the similarities will not be repeated.

As shown in FIG. 3, the scheduling and deploying, based on a domain controller node of the domain controller system, a container corresponding to the domain controller node includes the following steps.

Step S310: performing, based on a current operation status of the domain controller system, capacity expansion or capacity reduction on the container corresponding to the domain controller node by utilizing the domain controller node.

Step S320: when the container corresponding to the domain controller node is a failed container, deleting the failed container and creating a new container corresponding to the failed container by utilizing the domain controller node.

It should be noted that, there is no sequential relationship between Step S310 and Step S320. Step S310 and Step S320 may be performed at the same time, or only a method in any one of the steps may be executed. That is to say, when the domain controller node is used to schedule and deploy the container of the node, the capacity expansion operation or capacity reduction operation may be performed on the container of the node by utilizing the domain controller node based on the current operation status of the domain controller system, and if the container of the node is in a failure state, the failed container may be deleted by utilizing the domain controller node at the same time, and a new container corresponding to the failed container will be created by the domain controller node.

The embodiment of the present application provides a specific scheduling and deployment method for the domain controller node when the domain controller system is in a formal environment. In a real application environment with a higher performance requirement, a better performance index may be provided for scheduling and deploying the container of the node by utilizing the domain controller node in the cluster.

In an exemplary embodiment of the present application, the scheduling and deploying, based on a remote server of the domain controller system, the container corresponding to the domain controller node includes: distributing, based on a usage scenario of the domain controller system, a container application corresponding to the usage scenario to the domain controller node of the domain controller system by utilizing the remote server, so that the domain controller node completes an application deployment.

Specifically, as described above, the remote server binds with the domain controller node based on the feature identifier of the domain controller node. Then, based on the usage scenario feature of the domain controller system, the container application corresponding to the usage scenario feature is distributed to the domain controller node, to enable the domain controller node to complete the application deployment.

In addition, when there is a requirement of the domain controller system for updating and upgrading an application model algorithm or function, a feature identifier of a domain controller node with the requirement may be collected continuously, so that a container application of relevant update may be pushed to a specified domain controller node to enable the domain controller node to complete a smooth upgrade of a related model algorithm and functional application container. If the upgrade fails, the domain controller node may also roll back to an original state quickly.

In a developing and debugging stage, generally a relevant application development or a code development is performed by a developer on its owner server or a personal computer terminal. At this time, based on communication network, some container applications to be debugged may be conveniently distributed and deployed into a corresponding domain controller node by utilizing the remote server.

In an exemplary embodiment of the present application, a containerd container is adopted as the container.

Specifically, the containerd container is a concise, robust, and portable container for decoupling functional modules within the domain controller node.

In addition, the containerd container adopted in the domain controller system in this embodiment of the present application has been optimized on the domain controller system. Related modules that is not applicable to the usage scenario of the domain controller system are removed, and optimization on specific scenes is added. The specific scene refers to some scenes where a requirement for a higher performance and a higher security, compared with that required by the remote server, is achieved on the domain controller.

In the embodiment of the present application, the functional modules in the domain controller node are decoupled based on the container, and containers are completely isolated, so that an abnormal operation of the whole system caused by an abnormality of one module in a traditional application program system may be avoided. That is, the solution in this embodiment of the present application may ensure a basic stability of the system. In addition, based on the containerd container, the functional modules in the domain controller node are decoupled, which further realizes a plug-in extension and reuse of the domain controller system to reduce transplant difficulty of the domain controller system. A subsequent developer may smoothly migrate an algorithm model container and a functional container of its own on the premise that the operating system is insensitive, thereby effectively reducing development difficulty for users and realizing reusability of the functional component. The plug-in extension may also realize an addition and deletion of a new function in the container without affecting a normal operation of other services.

In an exemplary embodiment of the present application, a docker container may also be adopted to the container.

In an exemplary embodiment of the present application, a K3s deployment mode is applied to the container.

The K3s adopted in the embodiment of the present application has also been optimized on the domain controller system. Related modules that is not applicable to the usage scenario of the domain controller system are removed, and an optimization on specific scenes are added.

Specifically, the K3s deployment mode is a fully certified lightweight distribution version of Kubernetes, which may perform high optimization on scenes such as edge computing, reduce external dependence to the greatest extent, effectively reduce a resource consumption required by the cluster, and adapt to and satisfy a usage scenario and performance requirement of the domain controller. In addition, the K3s deployment mode abandons a hypervisor which is a common configuration of a virtual machine. Absence of the hypervisor layer may reduce complexity of the domain controller system, so that it is simpler to build a domain controller system and easier to troubleshoot. Furthermore, since a configuration of the K3s deployment mode is simpler, a management service and software deployment on the domain controller system may also be easier.

In configuration distribution of the domain controller system, compared with a common mode of utilizing a hypervisor layer to realize deployment and management of a system, an orchestration and deployment method of K3s may enable the system to ensure a higher performance. In addition, an application program may directly access a central processing unit, a random access memory, and other hardware resources, so that a lower system latency and a maximization of resource usage are achieved. No consumption of the hypervisor layer also means that a module which is sensitive to a latency requirement has better performance. Likewise, any application program or workload that has a very high requirement on hardware may benefit from the direct system access, particularly in a usage scenario where central processors and graphics processors are dense and a large amount of memory are required, such as a domain controller system. Compared with a common virtualization solution, an adjacent virtual machine may deplete resources, thereby seriously affecting system performance. Furthermore, by adopting the K3s deployment mode, a smooth upgrade of a container in a domain controller node may be realized without shutting down the machine. In addition, if the upgrade fails, the container may also return to an original state.

In an exemplary embodiment of the present application, a kubernetes deployment mode is applied to the container.

Exemplary Apparatus and System

Embodiments of the container scheduling and deployment method of the present application are described in detail above with reference to FIG. 1 to FIG. 3. In the following, embodiments of an apparatus and system of the present application will be described in detail with reference to FIG. 4 to FIG. 6. It should be understood that a description of method embodiments corresponds to a description of apparatus and system embodiments. Therefore, parts that are not described in detail may be referred to the method embodiments aforementioned.

Figure 4:
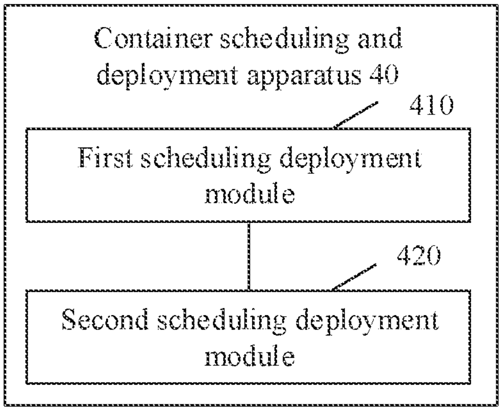
FIG. 4 is a schematic structural diagram of a container scheduling and deployment apparatus provided by an exemplary embodiment of the present application.

FIG. 4 is a schematic structural diagram of a container scheduling and deployment apparatus provided by an exemplary embodiment of the present application. As shown in FIG. 4, a container scheduling and deployment apparatus 40 provided by the embodiment of the present application includes:

a first scheduling and deployment module 410, configured to schedule and deploy, based on a domain controller node of the domain controller system, a container corresponding to the domain controller node when a current application environment of the domain controller system is a formal environment; and a second scheduling and deployment module 420, configured to schedule and deploy, based on a remote server of the domain controller system, the container corresponding to the domain controller node when the current application environment of the domain controller system is a development test environment.

In an embodiment of the present application, the first scheduling and deployment module 410 is further configured to perform, based on a current operation status of the domain controller system, capacity expansion or capacity reduction on the container corresponding to the domain controller node by utilizing the domain controller node.

In an embodiment of the present application, the first scheduling and deployment module 410 is further configured to delete a failed container and create a new container corresponding to the failed container by utilizing the domain controller node when the container corresponding to the domain controller node is a failed container.

In an embodiment of the present application, the second scheduling and deployment module 420 is further configured to distribute, based on a usage scenario of the domain controller system, a container application corresponding to the usage scenario to the domain controller node of the domain controller system by utilizing the remote server, so that the domain controller node completes an application deployment.

In an embodiment of the present application, a containerd container is adopted as the container, and the containerd container is used for decoupling functional modules in the domain controller node.

In an embodiment of the present application, a K3s deployment mode is applied to the container.

Figure 5:
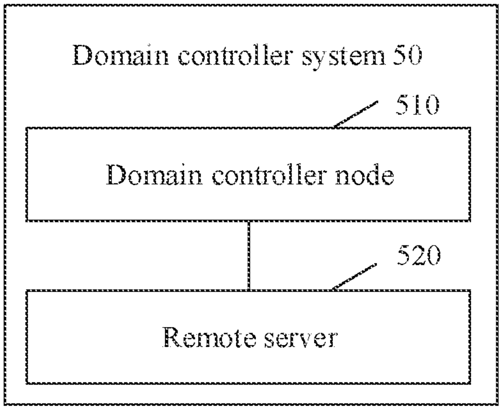
FIG. 5 is a schematic structural diagram of a domain controller system provided by an exemplary embodiment of the present application.

FIG. 5 is a schematic structural diagram of a domain controller system provided by an exemplary embodiment of the present application. As shown in FIG. 5, a domain controller system 50 provided by this embodiment of the present application includes:

a domain controller node 510, configured to schedule and deploy a container corresponding to the domain controller node when a current application environment of the domain controller system is a formal environment; and a remote server 520, configured to schedule and deploy the container corresponding to the domain controller node when the current application environment of the domain controller system is a development test environment.

Figure 6:
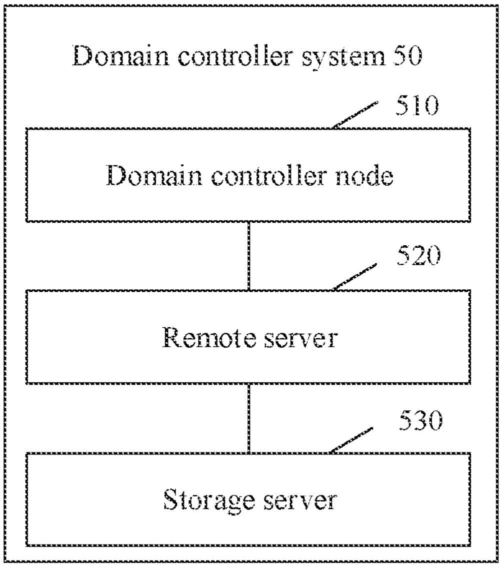
FIG. 6 is a schematic structural diagram of a domain controller system provided by another exemplary embodiment of the present application.

FIG. 6 is a schematic structural diagram of a domain controller system provided by another exemplary embodiment of the present application. As shown in FIG. 6, the domain controller system 50 provided by the embodiment of the present application further includes: a storage server 530, configured to store the container. Specifically, the storage server is a server which stores a related model algorithm and a functional requirement container.

When a current application environment of the controller system is a development test environment, a customized model algorithm and a functional requirement container are distributed to a corresponding storage server according to a customer requirement first, and then containers are distributed to domain controller nodes based on a feature identifier of the domain controller nodes and usage scenarios of the domain controller system acquired by the remote server, so that a related deployment of the model algorithm and functional requirement container based on different requirements is realized.

Figure 7:
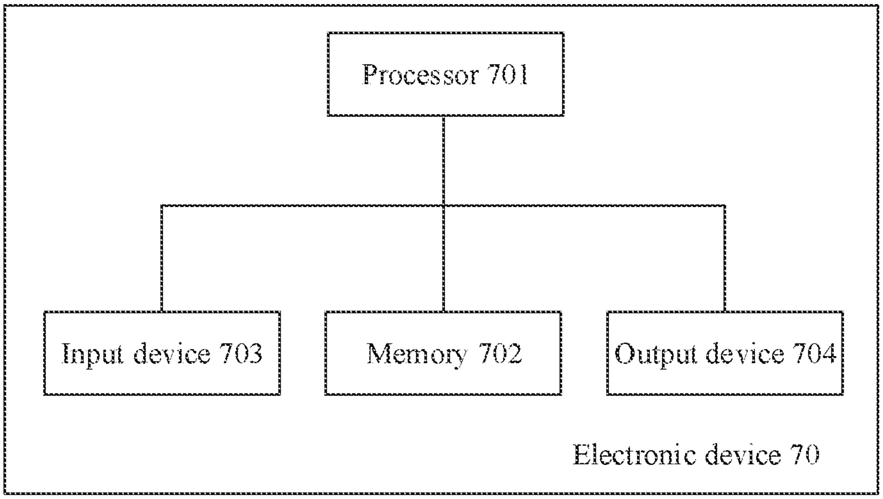
FIG. 7 is a schematic structural diagram of an electronic device provided by an embodiment of the present application.

Hereinafter, an electronic device according to an embodiment of the present application is described with reference to FIG. 7. FIG. 7 is a schematic structural diagram of an electronic device provided by an embodiment of the present application.

As shown in FIG. 7, an electronic device 70 includes one or more processors 701 and a memory 702.

The processor 701 may be a Central Processing Unit (CPU) or other forms of processing units having a data processing capability and/or an instruction execution capability, and may control other components in the electronic device 70 to perform a desired function.

The memory 702 may include one or more computer program products, which may include various forms of computer-readable storage media, such as a volatile memory and/or a non-volatile memory. The volatile memory may include, for example, a Random Access Memory (RAM) and/or a cache. The non-volatile memory may include, for example, a Read-Only Memory (ROM), a hard disk, a flash memory, and the like. One or more computer program instructions may be stored on the computer-readable storage medium, and the processor 701 may run the program instructions to implement the container scheduling and deployment method and/or other desired functions of the embodiments of the present disclosure described above. Various contents such as a container, a scheduling and deployment scheme, and current operating condition data of the domain controller system corresponding to the domain controller node may also be stored in the computer-readable storage medium.

In an example, the electronic device 70 may further include: an input device 703 and an output device 704 that are interconnected by a bus system and/or other forms of connection mechanisms (not shown).

The input device 703 may include, for example, a keyboard, a mouse, and the like.

The output device 704 may output various information to the outside, including a container corresponding to the domain controller node, a scheduling deployment scheme, current operation status data of the domain controller system, and the like. The output device 704 may include, for example, a display, a speaker, a printer, and a communications network and connected remote output device of the communications network, and the like.

Of course, for simplicity, only some of the components in the electronic device 70 related to the present application are shown in FIG. 7, and components such as a bus, an input/output interface, and the like are omitted. In addition, according to a specific application situation, the electronic device 70 may further include any other suitable component.

In addition to the foregoing method and device, an embodiment of the present application may further be a computer program product, including computer program instructions. When the computer program instruction is executed by the processor, the processor performs the steps in the container scheduling and deployment method according to various embodiments of the present application described in the present specification.

The computer program product may use any combination of one or more programming languages to write program code for executing the operation of the embodiments of the present application. The programming language includes object-oriented programming languages, such as Java, C++ and the like, as well as conventional procedural programming languages, such as "C" languages or similar programming languages. The program code may execute entirely on a user computing device, partly on a user device, as a stand-alone software package, partly on the user computing device, partly on a remote computing device, or entirely on the remote computing device or server.

In addition, the embodiments of the present application may also be a computer-readable storage medium on which computer program instructions are stored. When the computer program instructions are executed by the processor, the processor performs the steps in the container scheduling and deployment method according to various embodiments of the present application described in the present specification.

Computer readable storage medium may adopt any combination of one or more readable media. The readable medium may be a readable signal medium or a readable storage medium. The readable storage medium may include, but is not limited to, an electrical, magnetic, optical, electromagnetic, infrared, or semiconductor system, apparatus, or device, or any combination thereof. More specific examples of readable storage media (non-exhaustive lists) include an electrical connection with one or more wires, a portable disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination thereof.

The above describes basic principles of the present application in combination with specific embodiments. However, it should be pointed out that the advantages, superiority, effects, etc. mentioned in the present application are only examples rather than limitations, and cannot be considered as necessary for each embodiment of the present application. In addition, the specific details disclosed above are only for the purpose of example and ease of understanding, rather than limitation, and the above details do not limit the application must be implemented with the above specific details.

Block diagrams of the devices, apparatus, devices, and systems involved in the present application are merely illustrative examples and are not intended to require or imply that connections, arrangements, and configurations must be made in the manner shown in the block diagram. As those skilled in the art recognize, these devices, and systems may be connected, arranged, or configured in any manner. Words such as "including", "comprising", "having"; and the like are open-ended terms that mean "including but not limited to", and may are used interchangeably with them. The terms "or" and "and" as used herein refer to words "and/or" and may be used interchangeably, unless the context clearly indicates otherwise. The vocabulary "such as" used herein refers to a phrase "such as but not limited to" and is used interchangeably with it.

It should also be noted that the components or steps in the apparatus, device and methods of the present application may be broken down and/or recombined. Such decomposition and/or recombination shall be deemed to be equivalent to the present application.

The above description of the disclosed aspects are provided so that those skilled in the art may manufacture or use the present application. Various modifications to these aspects are quite obvious to those skilled in the art, and the general principles defined herein may be applied to other aspects without leaving a scope of the present application. Accordingly, the present application is not intended to be limited to the aspects shown herein, but rather to the broadest scope consistent with the principles and novel features disclosed herein.

The foregoing description has been presented for purposes of illustration and description. Moreover, the description is not intended to limit the embodiments of the present application to the forms disclosed herein. Although multiple example aspects and embodiments have been discussed above, those skilled in the art will recognize certain variations, modifications, changes, additions, and sub-combinations thereof.

What is claimed is:

1. A container scheduling and deployment method, applied to a domain controller system of a vehicle, comprising:

scheduling and deploying, based on a domain controller node of the domain controller system, a container corresponding to the domain controller node when a current application environment of the domain controller system is a formal environment; and scheduling and deploying, based on a remote server of the domain controller system, the container corresponding to the domain controller node when the current application environment of the domain controller system is a development test environment, wherein a containerd container is adopted as the container and is adjusted by removing one or more modules from the domain controller system based on the container corresponding to the domain controller node, and the containerd container is used for decoupling functional modules in the domain controller node, the decoupling comprising: isolating the functional modules to prevent failure of a functional module of the functional modules from causing failure of the entire domain controller system.

2. The container scheduling and deployment method according to claim 1, wherein the scheduling and deploying, based on the domain controller node of the domain controller system, the container corresponding to the domain controller node comprises:

performing, based on a current operation status of the domain controller system, capacity expansion or capacity reduction on the container corresponding to the domain controller node by utilizing the domain controller node.

3. The container scheduling and deployment method according to claim 1, wherein the scheduling and deploying, based on the domain controller node of the domain controller system, the container corresponding to the domain controller node comprises:

when the container corresponding to the domain controller node is a failed container, deleting the failed container and creating a new container corresponding to the failed container by utilizing the domain controller node.

4. The container scheduling and deployment method according to claim 1, wherein the scheduling and deploying, based on the remote server of the domain controller system, the container corresponding to the domain controller node comprises:

distributing, based on a usage scenario of the domain controller system, a container application corresponding to the usage scenario to the domain controller node of the domain controller system by utilizing the remote server, so that the domain controller node completes an application deployment.

5. The container scheduling and deployment method according to claim 1, wherein a K3s deployment mode is applied to the container.

6. The container scheduling and deployment method according to claim 1, wherein the container is configured to enable plug-in extension to add a new functional module in the container without affecting operations of the functional modules in the domain controller node.

7. A computer-readable storage medium, encoded with instructions that, when executed by one or more computers, cause the one or more computers to perform operations, the operations comprising:

scheduling and deploying, based on a domain controller node of a domain controller system of a vehicle, a container corresponding to the domain controller node when a current application environment of the domain controller system is a formal environment; and scheduling and deploying, based on a remote server of the domain controller system, the container corresponding to the domain controller node when the current application environment of the domain controller system is a development test environment;

wherein a containerd container is adopted as the container and is adjusted by removing one or more modules from the domain controller system based on the container corresponding to the domain controller node, and the containerd container is used for decoupling functional modules in the domain controller node, the decoupling comprising:

isolating the functional modules to prevent failure of a functional module of the functional modules from causing failure of the entire domain controller system.

8. The computer-readable storage medium according to claim 7, wherein the scheduling and deploying, based on the domain controller node of the domain controller system, the container corresponding to the domain controller node comprises:

performing, based on a current operation status of the domain controller system, capacity expansion or capacity reduction on the container corresponding to the domain controller node by utilizing the domain controller node.

9. The computer-readable storage medium according to claim 7, wherein the scheduling and deploying, based on the domain controller node of the domain controller system, the container corresponding to the domain controller node comprises:

when the container corresponding to the domain controller node is a failed container, deleting the failed container and creating a new container corresponding to the failed container by utilizing the domain controller node.

10. The computer-readable storage medium according to claim 7, wherein the scheduling and deploying, based on the remote server of the domain controller system, the container corresponding to the domain controller node comprises:

distributing, based on a usage scenario of the domain controller system, a container application corresponding to the usage scenario to the domain controller node of the domain controller system by utilizing the remote server, so that the domain controller node completes an application deployment.

11. The computer-readable storage medium according to claim 7, wherein a K3s deployment mode is applied to the container.

12. The computer-readable storage medium according to claim 7, wherein the container is configured to enable plug-in extension to add a new functional module in the container without affecting operations of the functional modules in the domain controller node.

13. An electronic device, comprising:

a processor;

a memory for storing an instruction executable by the processor, wherein the processor is configured to execute operations, the operations comprising:

scheduling and deploying, based on a domain controller node of a domain controller system of a vehicle, a container corresponding to the domain controller node when a current application environment of the domain controller system is a formal environment; and scheduling and deploying, based on a remote server of the domain controller system, the container corresponding to the domain controller node when the current application environment of the domain controller system is a development test environment;

wherein a containerd container is adopted as the container and is adjusted by removing one or more modules from the domain controller system based on the container corresponding to the domain controller node, and the containerd container is used for decoupling functional modules in the domain controller node, the decoupling comprising: isolating the functional modules to prevent failure of a functional module of the functional modules from causing failure of the entire domain controller system.

14. The electronic device according to claim 13, wherein the scheduling and deploying, based on the domain controller node of the domain controller system, the container corresponding to the domain controller node comprises:

performing, based on a current operation status of the domain controller system, capacity expansion or capacity reduction on the container corresponding to the domain controller node by utilizing the domain controller node.

15. The electronic device according to claim 13, wherein the scheduling and deploying, based on the domain controller node of the domain controller system, the container corresponding to the domain controller node comprises:

when the container corresponding to the domain controller node is a failed container, deleting the failed container and creating a new container corresponding to the failed container by utilizing the domain controller node.

16. The electronic device according to claim 13, wherein the scheduling and deploying, based on the remote server of the domain controller system, the container corresponding to the domain controller node comprises:

distributing, based on a usage scenario of the domain controller system, a container application corresponding to the usage scenario to the domain controller node of the domain controller system by utilizing the remote server, so that the domain controller node completes an application deployment.

17. The electronic device according to claim 13, wherein a K3s deployment mode is applied to the container.

18. The electronic device according to claim 13, wherein the container is configured to enable plug-in extension to add a new functional module in the container without affecting operations of the functional modules in the domain controller node.

* * * * *